United States Patent [19]
Nakagawa et al.

[11] Patent Number: 5,520,534
[45] Date of Patent: May 28, 1996

[54] HEATING APPARATUS INCLUDING PLURALITY OF REGENERATIVE BURNER UNITS AND OPERATING METHOD

[75] Inventors: Tsuguhiko Nakagawa; Yoshiyuki Nakanishi; Motohiro Hirata; Koushi Kuramoto; Masamitsu Obashi, all of Okayama; Yoshio Abe, Tokyo; Toshiyasu Yuri, Tokyo; Kazuhiro Kojima, Tokyo; Mamoru Yagi, Tokyo; Shoshichiro Tajima, Tokyo, all of Japan

[73] Assignees: Kawasaki Seitetsu Kabushiki Kaisha, Kobe; Otto Corporation, Tokyo, both of Japan

[21] Appl. No.: 290,974

[22] PCT Filed: Dec. 24, 1993

[86] PCT No.: PCT/JP93/01875

§ 371 Date: Dec. 15, 1994

§ 102(e) Date: Dec. 15, 1994

[87] PCT Pub. No.: WO94/15149

PCT Pub. Date: Jul. 7, 1994

[30]     Foreign Application Priority Data

| Dec. 25, 1992 | [JP] | Japan | 4-094317 |
| Dec. 25, 1992 | [JP] | Japan | 4-094318 |
| Dec. 25, 1992 | [JP] | Japan | 4-361925 |
| Dec. 25, 1992 | [JP] | Japan | 4-361926 |
| Mar. 2, 1993 | [JP] | Japan | 5-079984 |
| Mar. 2, 1993 | [JP] | Japan | 5-079985 |
| Mar. 22, 1993 | [JP] | Japan | 5-100006 |
| Mar. 31, 1993 | [JP] | Japan | 5-073088 |
| Mar. 31, 1993 | [JP] | Japan | 5-108680 |
| Mar. 31, 1993 | [JP] | Japan | 5-108684 |

[51] Int. Cl.⁶ .................................................. F23D 11/44
[52] U.S. Cl. .................... 431/215; 431/11; 126/91 A; 432/150
[58] Field of Search .................. 431/11, 215; 126/91 A; 432/150

[56]            References Cited

FOREIGN PATENT DOCUMENTS

| 58-55614 | 4/1983 | Japan . |
| 60-259823 | 12/1985 | Japan . |
| 61-243219 | 10/1986 | Japan . |
| 2-45353 | 3/1990 | Japan . |
| 2-27325 | 7/1990 | Japan . |
| 2-178515 | 7/1990 | Japan . |
| 3-30683 | 6/1991 | Japan . |
| 4-316919 | 2/1992 | Japan . |
| 4-28276 | 3/1992 | Japan . |
| 2-175239 | 6/1992 | Japan . |
| 4208302 | 7/1992 | Japan . |

*Primary Examiner*—Larry Jones
*Attorney, Agent, or Firm*—Anderson Kill Olick & Oshinsky

[57]            ABSTRACT

A heating apparatus includes at least a pair of regenerative burner units having a fuel injection nozzle and a heat regenerator provided for a combustion air supply path. One regenerative burner unit is supplied with fuel through a fuel shut-off valve and a fuel change-over valve, and supplied with combustion air through a supply and exhaust change-over valve to perform combustion operation. The other regenerative burner unit performs heat regenerating operation by passing a combustion waste gas. Operations of the fuel shut-off valve, the fuel change-over valve and the supply and exhaust change-over valve are controlled depending upon an operation parameter of the heating apparatus.

27 Claims, 18 Drawing Sheets

FIG. 20
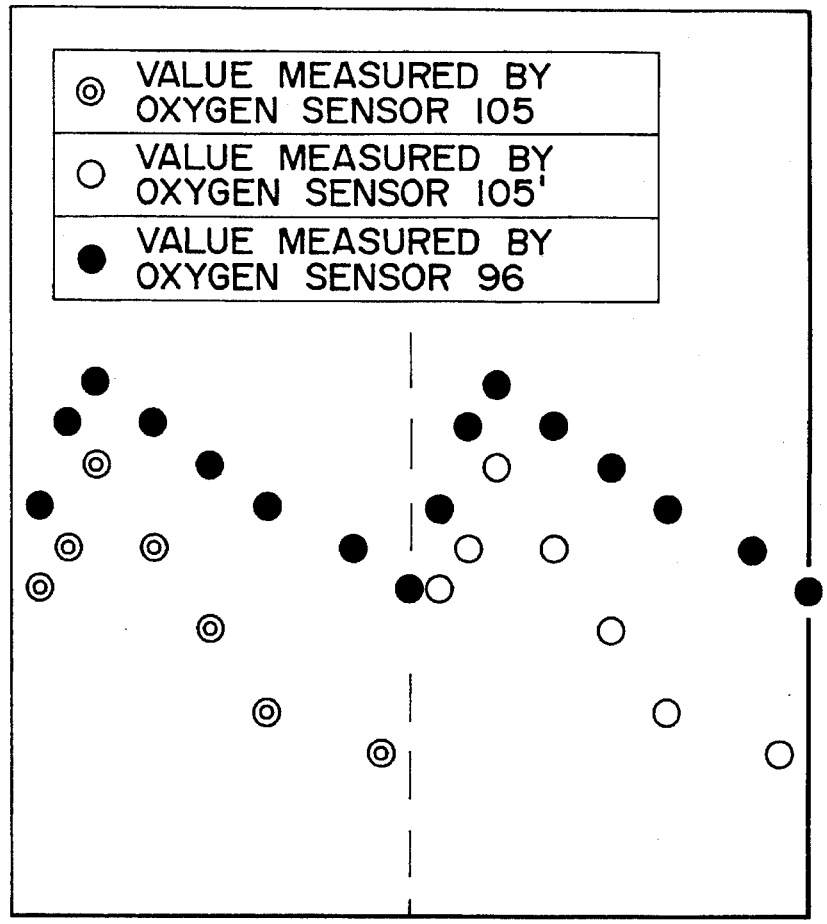
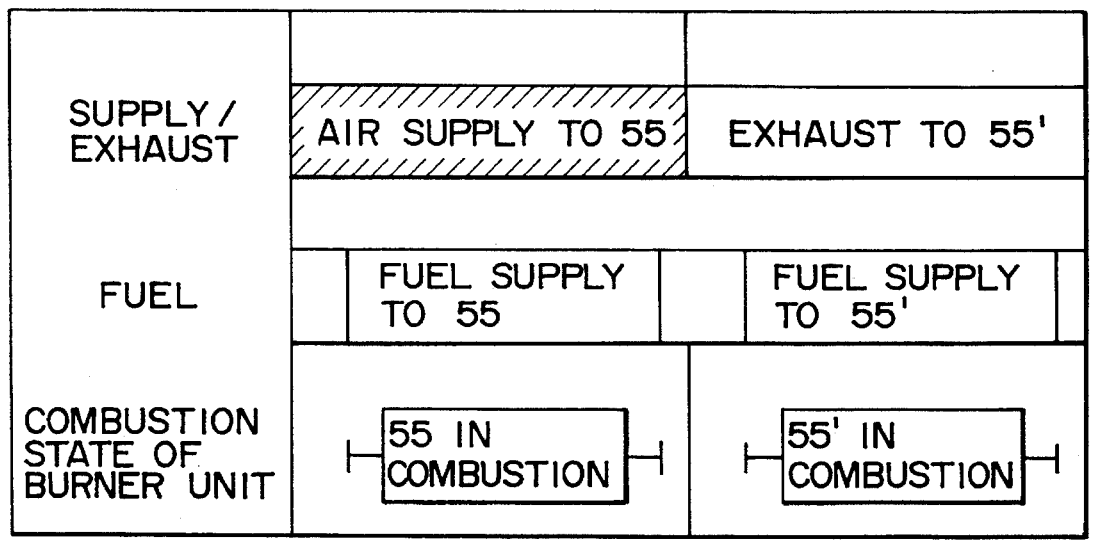

5,520,534

HEATING APPARATUS INCLUDING PLURALITY OF REGENERATIVE BURNER UNITS AND OPERATING METHOD

TECHNICAL FIELD

This invention relates to a heating apparatus, which uses regenerative burner units including at least a pair of regenerative burner units having a fuel injection nozzle and a heat regenerator provided for a combustion air supply path and employing such an alternative change-over combustion system that one regenerative burner unit is supplied with fuel through a fuel shut-off valve and a fuel change-over valve, and supplied with combustion air through a supply and exhaust change-over valve to carry out combustion operation, while the other regenerative burner unit is operated for heat regeneration by passing a combustion waste gas, and an operating method of such an heating apparatus.

BACKGROUND ART

Such a heating apparatus is well known in the art (See Japanese Patent Laid-open No. 2-254210) and can be used to carry out exhaust heat recovery, resulting in enhancement of thermal efficiency.

DISCLOSURE OF THE INVENTION

It is an object of the present invention to ensure combustion stability of a heating apparatus including one regenerative burner unit for combustion operation and another regenerative burner unit for regenerative operation by relatively simple means.

Further, according to the present invention, it is possible to more enhance thermal efficiency of the heating apparatus. In addition, according to the present invention, it is possible to prevent a thermally damageable member from being exposed to a hot combustion waste gas.

Besides, according to the present invention, it is possible to facilitate removal or attachment of a heat regenerator in the regenerative burner unit of the heating apparatus, and facilitate exchange of only one part thereof.

According to the present invention, at least one sensor for measuring a temperature of the combustion waste gas is mounted in a conduit for externally exhausting the combustion waste gas through a supply and exhaust change-over valve.

In the heating apparatus according to the present invention, flow regulating valves are respectively provided for air conduits for supplying combustion air and interposed between the respective regenerative burner units and the supply and exhaust change-over valve.

A fuel change-over valve includes one three-way valve which is attached to both the regenerative burner units in common. The supply and exhaust change-over valves may include two three-way valves respectively attached to both the regenerative burner units.

The heat regenerator of the regenerative burner unit constituting the heating apparatus includes a plurality of segments. The segment itself may be formed by the heat regenerator, or a large number of heat regenerating elements may be accommodated in a segment-shaped container.

The regenerative burner unit includes a main burner and a pilot burner, and a burner gun of the main burner includes the pilot burner and a combined ignition and flame detection electrode for the pilot burner.

With respect to an operation of the heating apparatus as described above, according to the present invention, it is proposed that the temperature of the waste gas may be measured after providing heat for the heat regenerator of the regenerative burner unit for regenerative operation so as to change the fuel change-over valve and the supply and exhaust change-over valve depending upon the measured waste gas temperature.

Further, successive measurement on a specified cycle is made to measure the unburnt gas concentration of the combustion waste gas externally exhausted from the regenerative burner unit for regenerative operation through the supply and exhaust change-over valve. When the unburnt gas concentration detected in a specified decision cycle increases to exceed a specified upper limit after a time point where the unburnt gas concentration exceeds a specified lower limit, fuel fed into the regenerative burner unit for combustion operation is immediately shut off. When the detected unburnt gas concentration is between the upper limit and the lower limit, an alarm is activated at a time of end of the cycle and/or the fuel fed into the regenerative burner unit for combustion operation is shut off.

According to the present invention, comparison is proposed between one oxygen concentration measured value of the combustion waste gas from the heating apparatus or one oxygen concentration measured value of the combustion waste gas flowing from the regenerative burner unit for regenerative operation to the supply and exhaust change-over valve after heat exchange and another oxygen concentration measured value of the combustion waste gas externally exhausted from the supply and exhaust change-over valve.

BRIEF DESCRIPTION OF THE DRAWINGS

FIG. 20 shows another combustion changing sequence of the heating apparatus and a chart of oxygen concentration of each oxygen sensor;

FIG. 22 is a connection diagram of a still further modification of the heating apparatus.

BEST MODE FOR EMBODYING THE INVENTION

The present invention will hereinafter be described with reference to a heating apparatus employing a radiant tube. However, it must be noted that the present invention should not be limited to such a heating apparatus.

Figure 1:
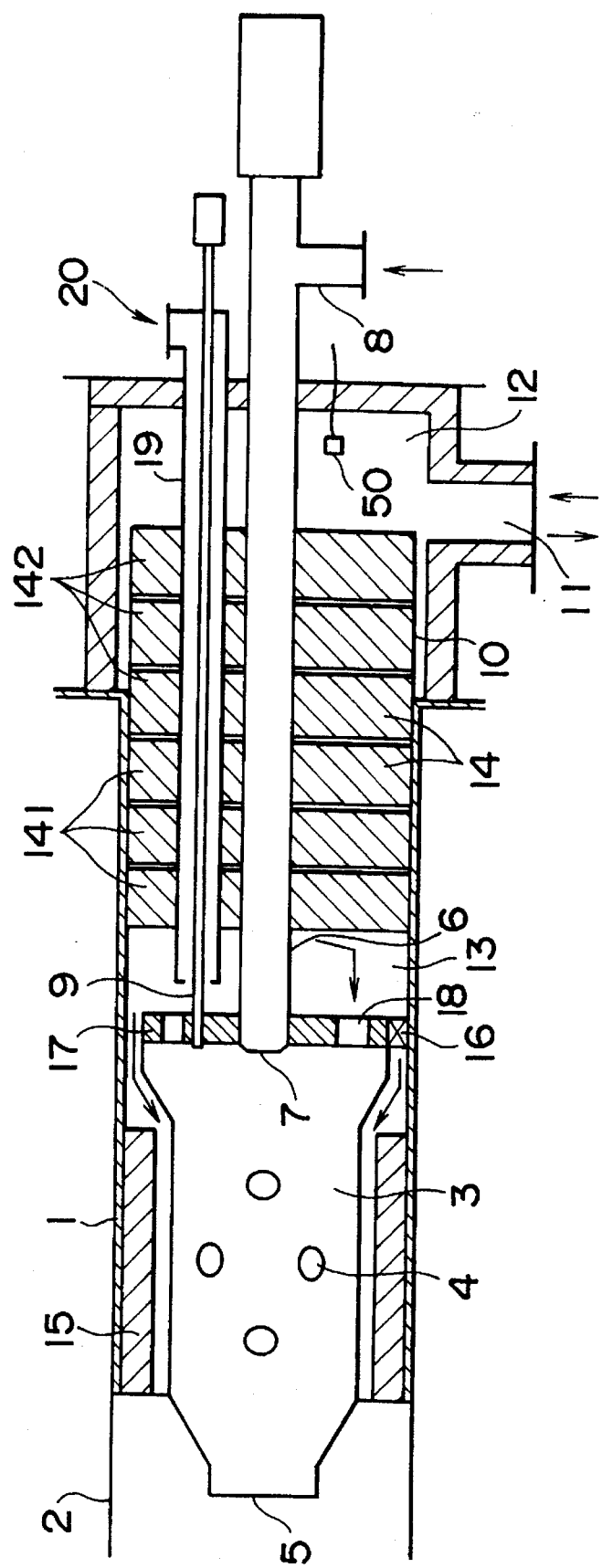
FIG. 1 is a longitudinal sectional view showing a regenerative burner unit used for a heating apparatus according to the present invention.

In FIG. 1, a cylindrical housing 1 connected to the end of a radiant tube 2 extending to the inside of a heating furnace is coaxially provided with a combustion cylinder 3 made of metal or ceramics at a radial interval. A plurality of holes 4 are distributively provided in a peripheral wall of the combustion cylinder 3, and the tip end of the combustion cylinder is tapered to form a nozzle 5. A main burner 6 passes through a furnace wall along a center axis of the combustion cylinder 3, and is opened to a rear portion of the combustion cylinder 3. The tip end of the main burner 6 forms a nozzle 7. Fuel such as a gas is fed into the rear end of the main burner 6 located on the outside of the furnace through a fuel connecting port 8. On the outside of the main burner 6, a pilot burner 9 extends parallel to the main burner 6. Cooling air is continuously fed into an air guide pipe 19, which encloses the substantially entire length portion of the pilot burner 9, through a cooling air connecting port 20. An air guide cylinder 10 connected to the rear of the radiant tube 2 and extending to the outside of the furnace coaxially with the radiant tube 2 is opened to an air supply chamber 12 having a combustion air connecting port 11. A temperature measuring sensor 50 is provided in the air supply chamber 12. An annular air supply path 13 defined between the main burner 6 and the air guide cylinder 10 is axially provided with a plurality of annular heat regenerators 14. A protective cylinder 15 made of ceramics is provided at a radial interval around the combustion cylinder 3 in a range having the holes 4. A plurality of holes 18 are provided in an end wall 17 for closing the rear end of the combustion cylinder 3 supported in the cylindrical housing 1 through a bracket metal fitting 16. The end wall 17 is also useful in supporting the tip end of main burner 6 and that of the pilot burner 9 passing therethrough.

Figure 2A:
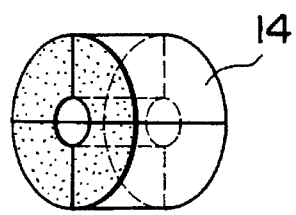
FIG. 2 is a perspective view showing various structures of a heat regenerator thereof.

As shown in FIG. 2(A), the annular heat regenerator 14 is made of, for example, ceramics, and has a large number of axial pores of about 1 mm. Each heat regenerator 14 includes a plurality of segments (four of which are shown) which are easily exchangeable in case of clogging of the pore.

A heat regenerator 141 mounted closer to the combustion cylinder 3 and exposed to high temperature may be made of ceramics, while another heat regenerator 142 mounted farther from the combustion cylinder 3 and exposed to low temperature may be made of metal, preferably alloy steel (mesh).

Figure 2B:
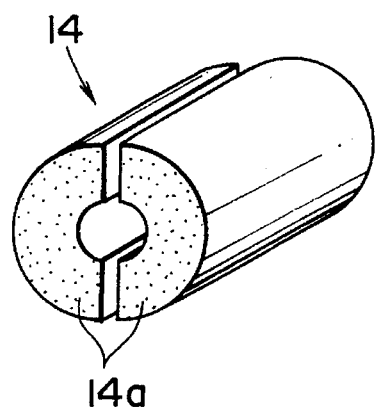
Figure 2C:
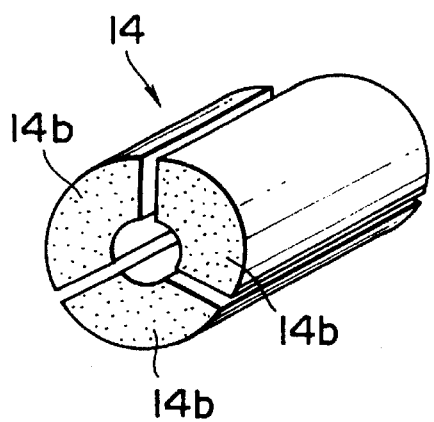
Figure 2D:
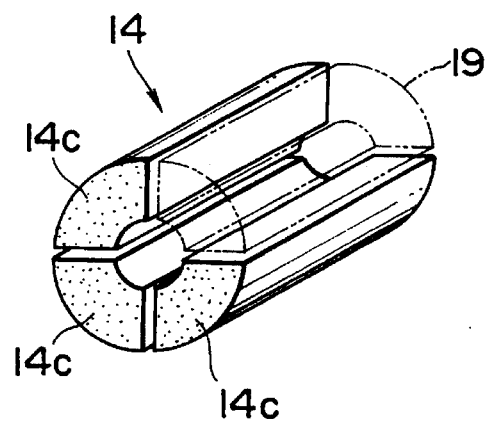

The ceramic heat regenerator 14 may be composed of two segments 14a having a center angle of about 180° [See FIG. 2(B)], or three segments 14b having a center angle of about 120° [See FIG. 2(C)] or four segments 14c having a center angle of about 90° [See FIG. 2(D)].

As apparent from FIG. 2(D), except a space for the pilot burner 9, the three segments 14c having the center angle of about 90° may be mounted. In this case, when the air guide pipe 19 is designed to have substantially the same section as that of the segment 14c, the annular air guide path 13 is filled with the air guide pipe 19 and the three segments 14c. As a result, it is possible to avoid a short pass of a gas passing through the guide path 13.

Figure 2E:
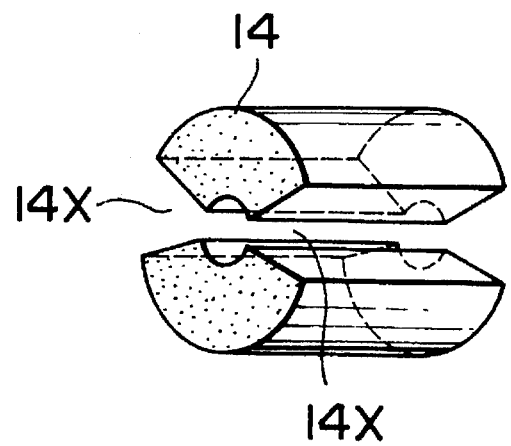
Figure 2F:
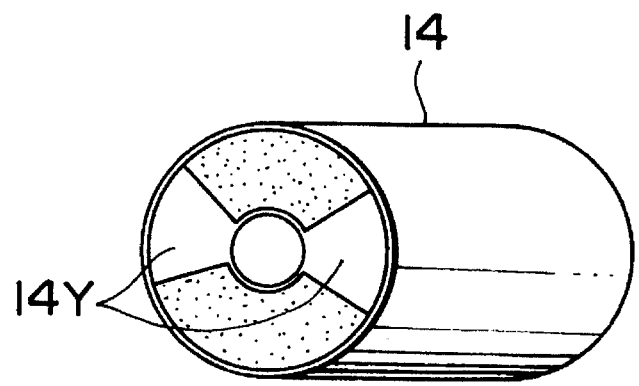

Referring now to FIG. 2(E), for example, the heat regenerator 14 is composed of two segments having a center angle of 120° so as to form notches 14X having a sector-shaped section to axially extend therebetween. As shown in FIG. 2(F), these notches may be blocked by a sector-shaped masking shield 14Y at an end surface of the heat regenerator 14. It is also possible to attach such a masking shield 14X to an end surface of the annular heat regenerator 14.

Figure 3:
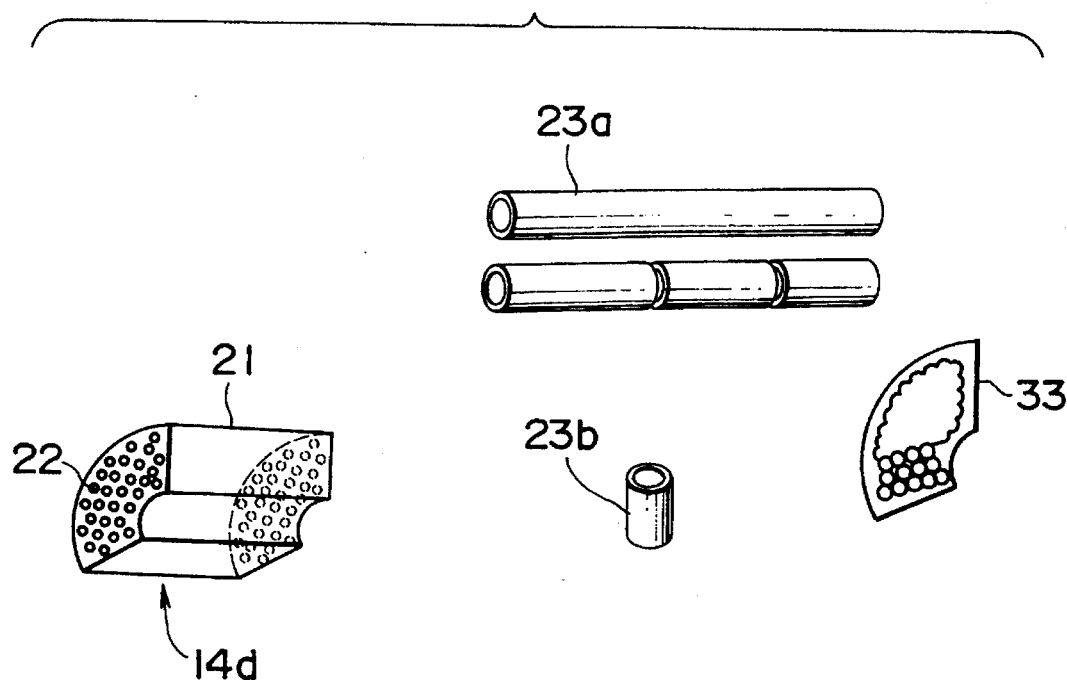
FIGS. 3 and 4 are perspective views showing different modifications of the heat regenerator.

As shown in FIG. 3, a segment-shaped refractory steel case 21 having substantially the same section as that of the ceramic segment 14c and provided with both end walls having a large number of pores 22 of, for example, 12 mm in diameter accommodates hollow ceramic heat regenerating elements 23a in parallel, each of which has a diameter of, for example, 12 mm and is identical with the refractory steel case 21 in length or is longitudinally divided into several pieces. A supporting plate 33 is mounted on the refractory steel case 21 such that the ceramic heat regenerating element 23a composed of a plurality of parts can have each longitudinal hole in alignment. Alternatively, a large number of ceramic heat regenerating elements 23b having a diameter of 12 mm and a length of 12 mm may be accommodated in the case 21 at random.

Figure 4:
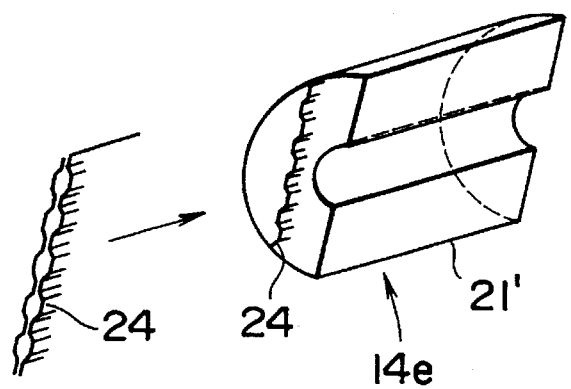

Further, as shown in FIG. 4, it is also possible to axially insert a plurality of irregular plates 24 as the heat regenerating element in a segment-shaped refractory steel case 21' which is opened at both ends thereof.

Figure 5:
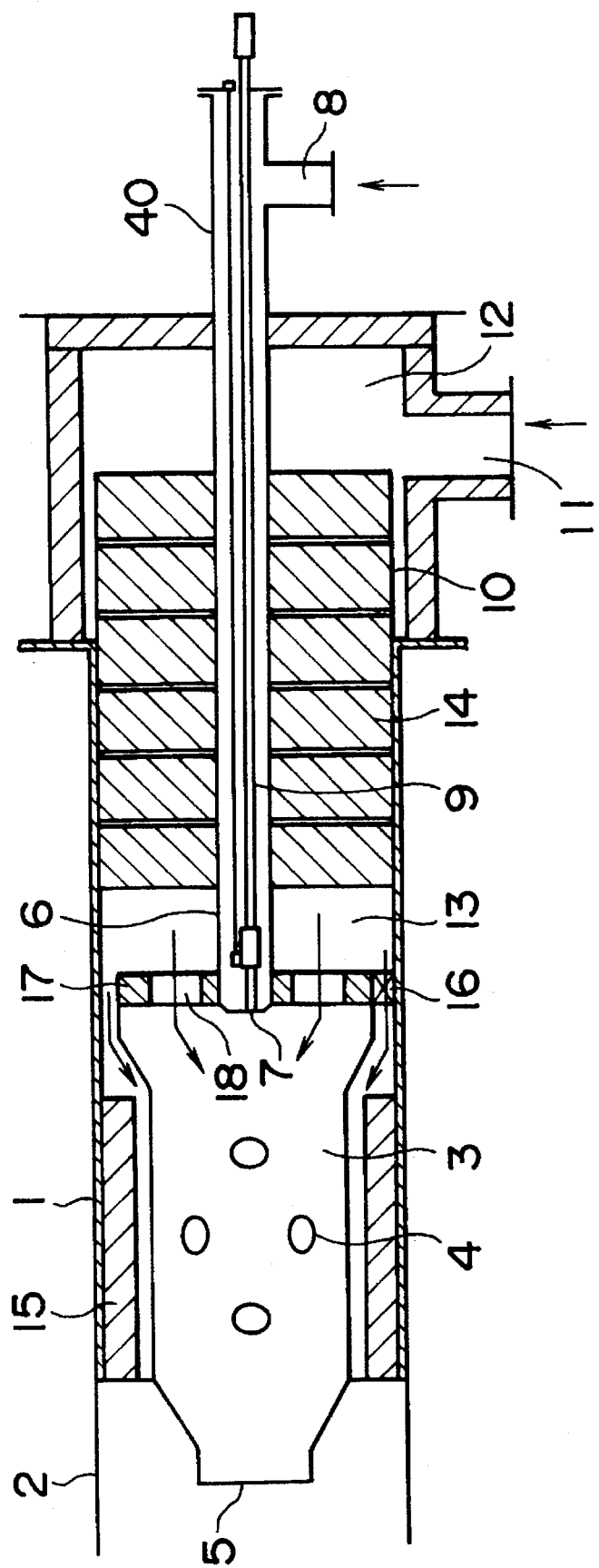
FIG. 5 is a longitudinal sectional view showing a modification of the regenerative burner unit.

In a regenerative burner unit as shown in FIG. 5, a pilot burner 9 extends parallel to a main burner 6 in the main burner 6.

Figure 6:
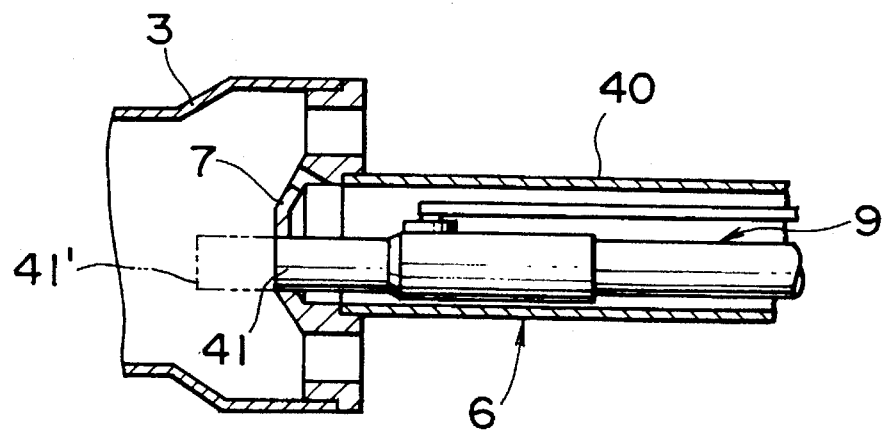
FIGS. 6 and 7 are enlarged views showing a part of FIG. 5.
Figure 7:
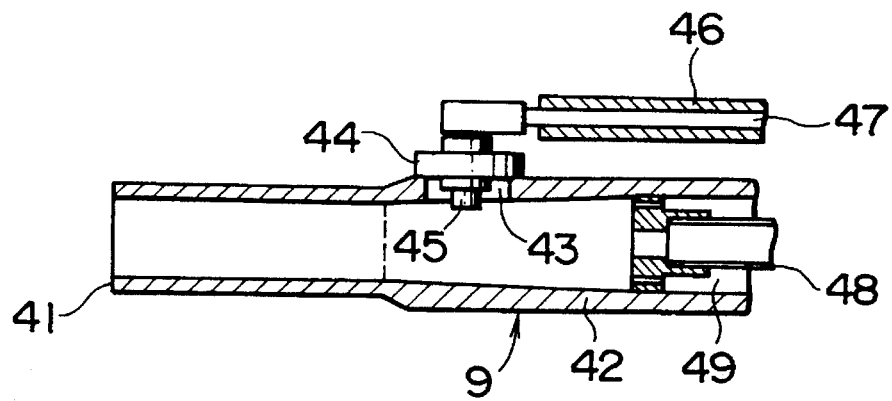

As apparent from FIG. 6, the pilot burner 9 is mounted parallel to the main burner in a burner gun 40 of the main burner 6, and a tip end 41 thereof reaches substantially the same end surface as that of the nozzle 7 or extends from the nozzle 7 as shown by the chain line 41'. As shown in FIG. 7, a burner tube 42 of the pilot burner 9 is provided with an aperture 43 at a position which is backward spaced from the tip end 41 of the pilot burner 9, that is, in the burner gun 40 of the main burner. A combined ignition and flame detection pin electrode 45 insulated and supported by an insulating glass 44 slightly extends from the aperture 43 into a burner tube 42. The electrode 45 is externally drawn through a conductor 47 insulated by a glass 46. The tip end of a pilot fuel supply tube 48 concentrically mounted on the burner tube 42 and axially extending extends to a position immediately before the electrode 45 and is supported in the burner tube 42. In order to continuously maintain pilot flame of the pilot burner 9, the pilot fuel supply tube 48 is connected to a fuel source. An annular air path 49 defined between the pilot fuel supply tube 48 and the burner tube 42 is connected to an air source which is different from that for the main burner 6.

Figure 8:
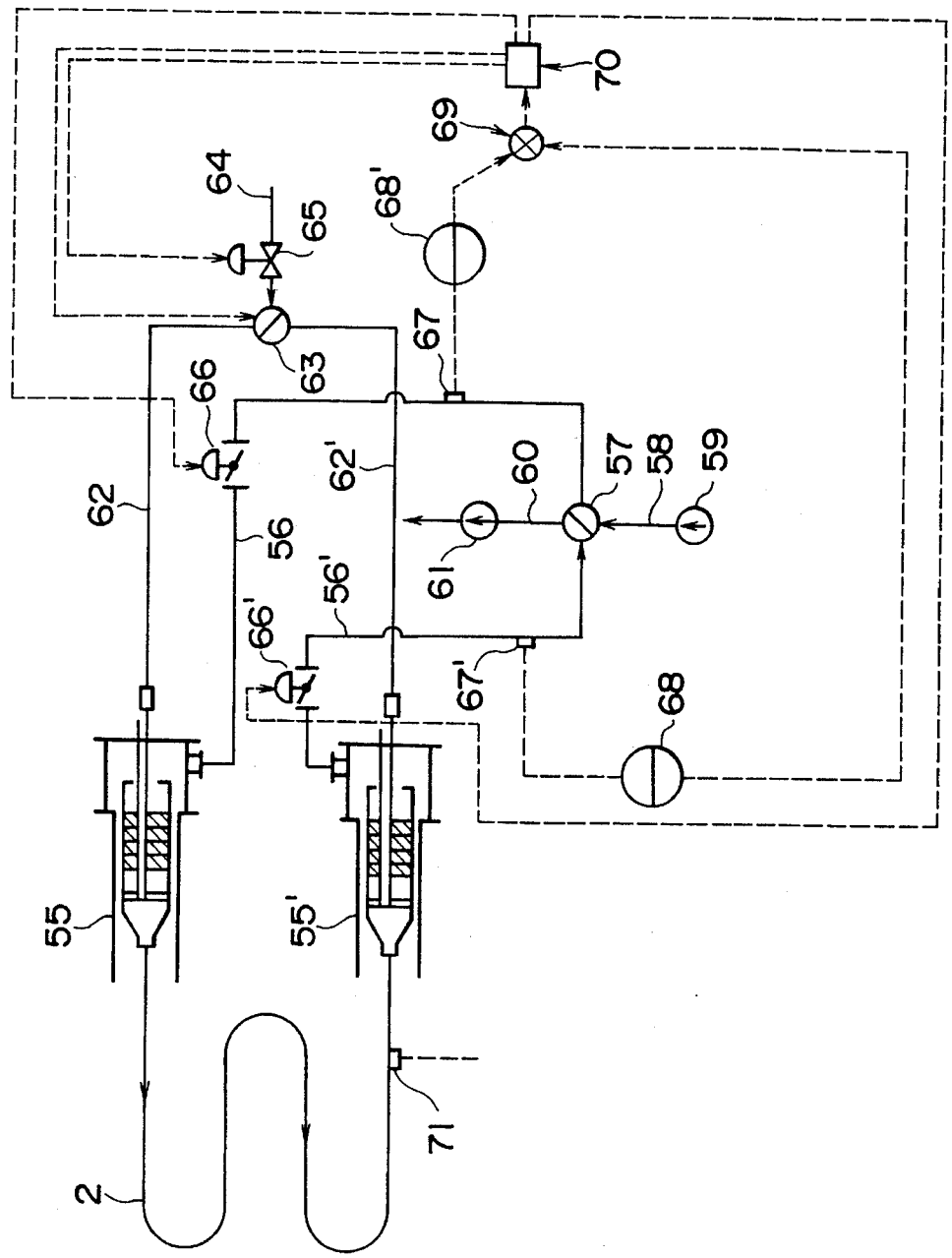
FIGS. 8 to 11 are connection diagrams of four embodiments of a heating apparatus including at least a pair of regenerative burner units.

FIG. 8 schematically shows the heating apparatus employing at least the pair of regenerative burner units as shown in FIG. 1 or 5. In the drawing, the regenerative burner units (hereinafter referred to as burner unit) are designated by reference numerals 55, 55'.

Two burner units 55 and 55' are connected to both ends of the radiant tube 2 extending in the heating furnace so as to constitute a regenerative heating apparatus. Air conduits 56, 56' respectively connected to combustion air connecting ports of both the burners 55, 55' can be selectively connected through a supply and exhaust change-over valve 57 to a forced draft fan serving as the air source via a conduit 58 or to an exhaust fan 61 via a conduit 60. Similarly, fuel conduits 62, 62' connected to fuel connecting ports of the burner units 55, 55' can be connected through a fuel change-over valve 63 to a gas source (not shown) serving as the fuel source via a conduit 64 having a fuel shut-off valve 65.

The air conduits 56, 56' are respectively provided with combustion air flow regulating valves 66, 66' and are respectively provided with oxygen sensors 67, 67' for measuring oxygen concentration of a combustion waste gas. The oxygen sensors 67, 67' provided for the air conduits 56, 56' can be selectively connected through a change-over switch 69 to a control unit 70 via combined indicator and alarm devices 68, 68', respectively. The change-over switch 69 is switched in combination with both the change-over valves 57 and 63 to provide the control unit 70 with a signal concerning the oxygen concentration of the combustion waste gas flowing through the air conduits 56, 56' of the burner unit for regenerative operation after radiation of heat. The control unit 70 controls the combustion air flow regulating valves 66, 66' in accordance with a deviation between a measured value and a predetermined value of the oxygen sensor 67 or 67'.

As apparent from FIG. 8, both the change-over valves 57 and 63 are respectively positioned at switching positions as shown in the drawing, the burner unit 55 is operated for combustion, and the burner unit 55' is operated for heat regeneration. Fuel fed into the burner unit 55 via the fuel conduit 62 and injected from the nozzle 7 of the main burner 6 is ignited through flame of the pilot burner by primary air similarly fed into the burner unit 55 from the air conduit 56 to pass through the heat regenerator 14 mounted on air supply path 13 so as to enter the combustion cylinder 3 through the hole 18 of the end wall 17, resulting in stable primary combustion in the combustion cylinder 3. A primary combustion gas partially passes through the hole 4 of the combustion cylinder 3 to be injected into an annular space defined between the combustion cylinder 3 and the protective cylinder 15, and the secondary combustion of the partially primary combustion gas is caused by secondary air fed by passing from the supply path 13 through an annular space defined between the combustion cylinder 3 and the cylindrical housing 1. The secondary air including the primary combustion gas causes the secondary combustion of the remaining primary combustion gas jetting from the nozzle 5 of the combustion cylinder 3.

The combustion gas generated by the primary combustion and the secondary combustion radiates heat in the heating furnace while passing through the radiant tube 2 and further causes radiation of heat with respect to the heat regenerator 14 of the burner unit 55', resulting in a reduced temperature. The combustion gas passes as the combustion waste gas through the air conduit 56' and the supply and exhaust change-over valve 57 to be externally exhausted by the exhaust fan 61. After the change-over valves 57 and 63 are changed, the burner unit 55' is operated for combustion, and the burner unit 55 is operated for heat regeneration. It is preferable to design such that a heat capacity of the heat regenerator 14 is not less than 0.4 times as much as the quantity of heat of the combustion waste gas.

In the above heating apparatus, when there is any difference in shapes of the heat regenerators in both the burner units or in a filling mode of the heat regenerating elements or the pore of the heat regenerator has clogging any damaged or the like, a difference is generated in a pressure loss of the combustion air passing through the heat regenerators. Accordingly, even if the combustion air is fed into both the burner units from the combustion air source under the same pressure, there is caused different flow rates of the combustion air passing through both the burner units, resulting in a difference in a combustion condition between both the burner units. For example, when the pressure loss in the heat regenerator of the burner unit 55 is greater than that in the heat regenerator under a normal state to generate air-deficient combustion, an oxygen concentration measured value of the oxygen sensor 67' becomes larger. When the measured value exceeds a predetermined value, the control unit 70 adjusts the opening degree of the combustion air flow regulating valve 66 to adjust an air flow of the burner unit 55 so as to provide normal combustion. In case it is impossible to control the air flow regulating valve 66 or 66' in the opening degree adjusting range, the control unit 70 alarms and closes the fuel shut-off valve 65 to interrupt supply of the fuel to the burner unit 55 for combustion operation. Further, the control unit 70 can decide a lifetime of the heat regenerator or a time to repair or exchange the heat regenerator. The same applies with regards to the burner unit 55'.

Pressure in the radiant tube 2 is varied according to the pressure loss of the combustion air preheated by the heat regenerator. Therefore, the pressure in the radiant tube 2 can be measured by a pressure sensor 71, and the flow regulating valve 66 or 66' can be controlled by the control unit 70 in relation to the pressure measured value.

Figure 9:
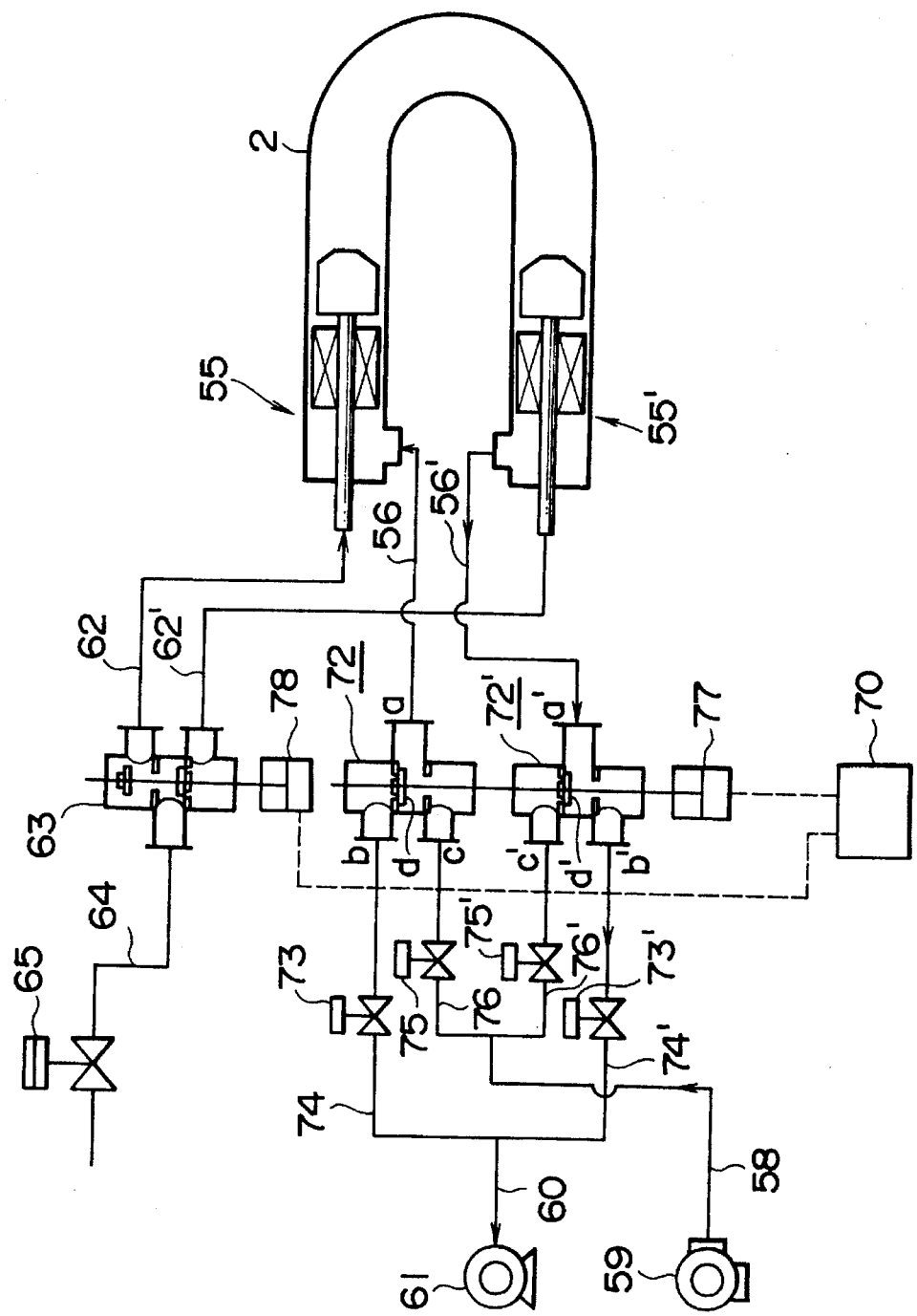

While, in FIG. 8, the supply and exhaust change-over valve 57 is attached to both the burner units 55 and 55' in common, two supply and exhaust change-over valves 72 and 72' are respectively attached to both the burner units 55 and 55' in FIG. 9.

The supply and exhaust change-over valves 72 and 72' have the same structure as that of the fuel change-over valve 63 and are respectively provided with three ports a, b, c and a', b', c' and changing movable value members d and d'. The ports a and a' of both the supply and exhaust change-over valves 72 and 72' are respectively connected to the air conduits 56 and 56', and ports b and b' thereof are respectively connected to the conduit 60 having the exhaust fan 61 through partial conduits 74 and 74' having solenoid valves 73 and 73'. Further, the ports c and c' thereof are respectively connected to the conduit 58 having the forced draft fan 59 through partial conduits 76 and 76' having solenoid valves 75 and 75'. Both the supply and exhaust change-over valves 72 and 72' are concurrently operated by a common servomotor 77 controlled by the control unit 70. The fuel change-over valve 63 is also operated by a servomotor 78 controlled by the control unit 70 in synchronization with the supply and exhaust change-over valves 72 and 72'.

Figure 10:
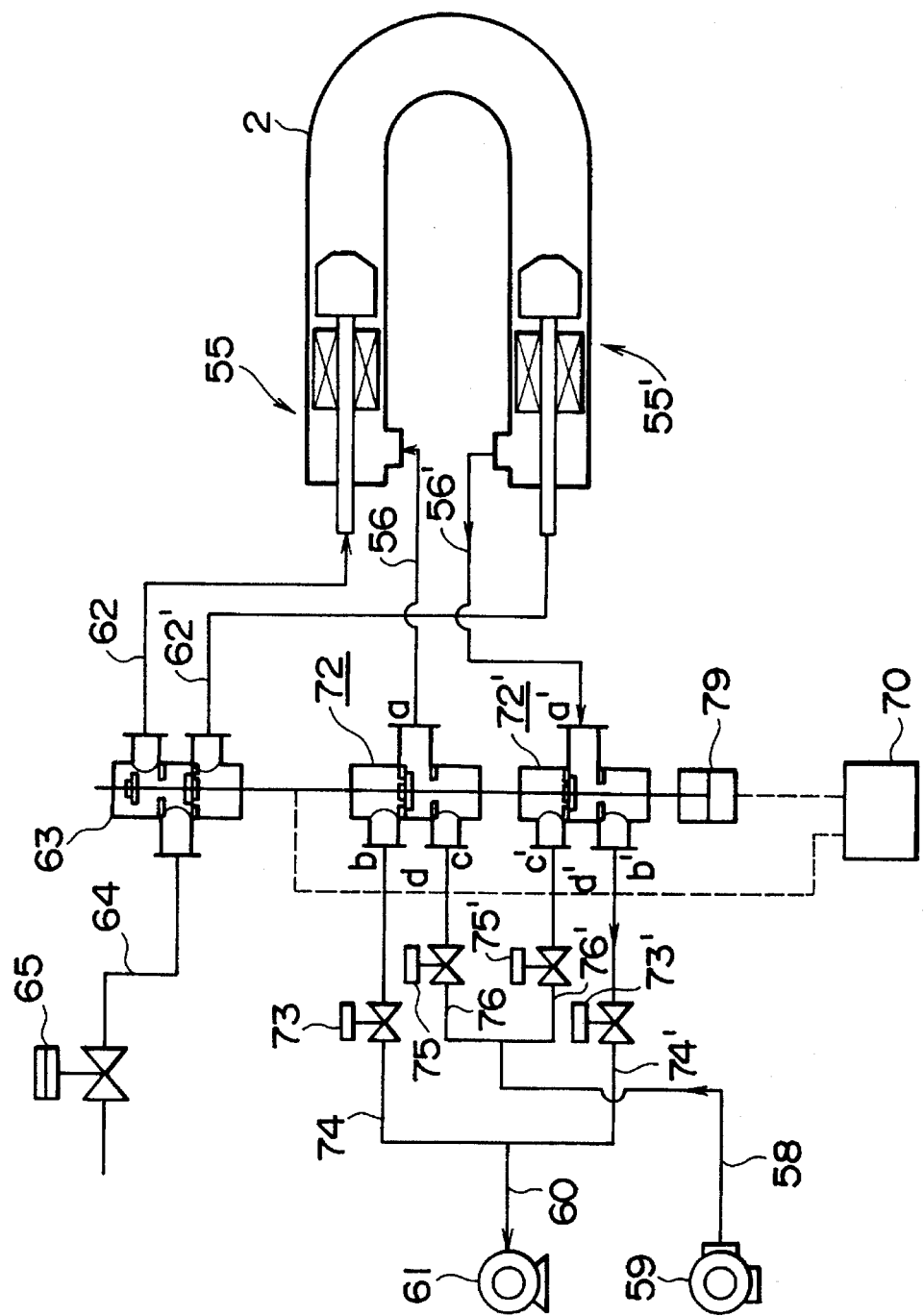

As shown in FIG. 10, the fuel change-over valve 63 and movable valve members of both the supply and exhaust change-over valves 72 and 72' may be connected to each other to be operated by a common servomotor 79.

As compared with a configuration in FIG. 8, configurations in FIGS. 9 and 10 have an advantage in that the combustion waste gas sucked by the exhaust fan 61 from the burner unit for heat regenerating operation is never contaminated with air fed into the burner unit for combustion operation.

Figure 11:
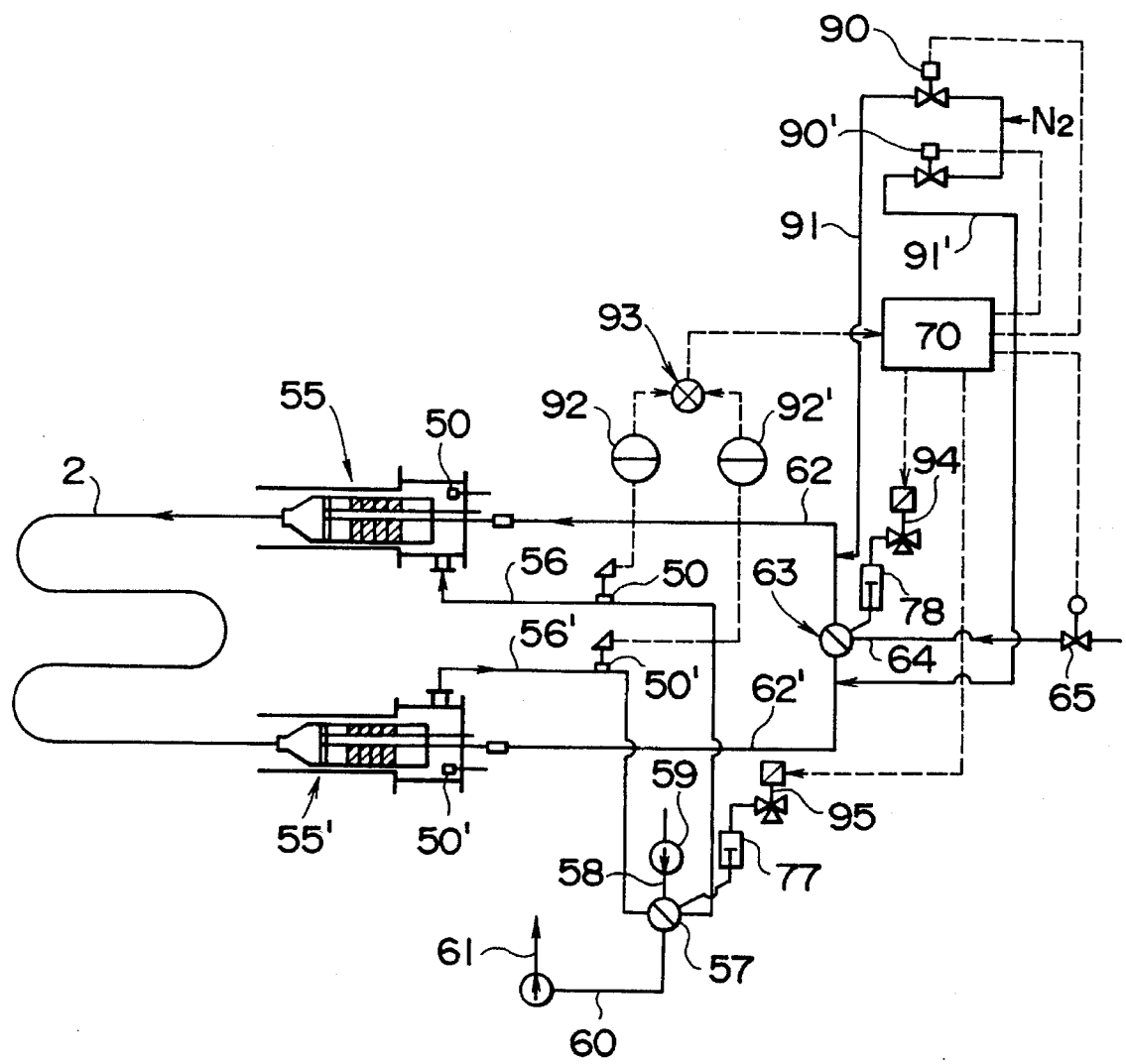

In FIG. 11, the fuel conduits 62, 62' are respectively connected to a gaseous nitrogen source through conduits 91, 91' having solenoid valves 90, 90'.

The temperature sensors 50, 50' are mounted on the air conduits 62, 62' or in the air supply chambers 12 of the burner units 55, 55', and can be selectively connected to the control unit 70 by a change-over switch 93 through combined temperature indicator and alarm devices 92, 92'. The change-over switch 93 is changed over in combination with both the change-over valves 57 and 63 to provide the control unit 70 with a signal concerning a temperature of the exhaust gas passing through the air supply chamber or the air conduit of the burner unit for heat regenerating operation after radiation of heat. According to output signals from the temperature sensors 50, 50', the control unit 70 urges a solenoid valve 94 for controlling supply and exhaust of operative pressure to the servomotor 78 for controlling the fuel change-over valve 63 and a solenoid valve 95 for controlling supply and exhaust of hydraulic pressure to the servomotor 78 for controlling the supply and exhaust change-over valve 57. Further, the control unit 70 can control the fuel shut-off valve 65 and the solenoid valves 90, 90'.

In FIG. 11, the fuel shut-off valve 65 is positioned at an opening position, and the change-over valves 57 and 63 are positioned at changing positions as shown in the drawing. The burner unit 55 is operated for combustion, and the burner unit 25' is operated for heat regeneration.

The combustion gas exiting the burner unit 55 radiates heat while passing through the radiant tube 2, and further radiates heat with respect to the heat regenerator 14 of the burner unit 55', resulting in a reduced temperature. When a temperature measured value of the combustion waste gas is measured by the temperature sensor 50', and is not more than a target lower limit, the operation is continued. When the measured value of the waste gas temperature exceeds a target upper limit, the change-over valves 57 and 63 are changed over through the control unit 70, and the burner unit 55' is operated for combustion, while the burner unit 55 is operated for heat regeneration.

As set forth above, the combustion operation and the heat regenerating operation are changed over according to the temperature of the combustion waste gas. As a result, it is possible to sufficiently recover waste heat of the combustion waste gas so as to improve thermal efficiency of the entire heating apparatus. For example, it is assumed that the target upper limit is 350° C., and the target lower limit is 150° C. in the temperature measured value of the combustion waste gas which is exhausted after radiation of heat to the heat regenerator. In this case, the burner unit for heat regenerating operation requires an operation time of 60 second, and provides thermal efficiency of about 80%. When the target upper limit is 250° C., and the target lower limit is 150° C., the burner unit for heat regenerating operation requires an operation time of about 40 second, and provides thermal efficiency of not less than 85%. The target lower limit is selected to be equal to or more than a dew point of the combustion waste gas. Since the dew point varies in relation to $SO_3$ concentration in the combustion waste gas, the target lower limit is preferably selected in a range from 130° to 150° C.

Figure 12:
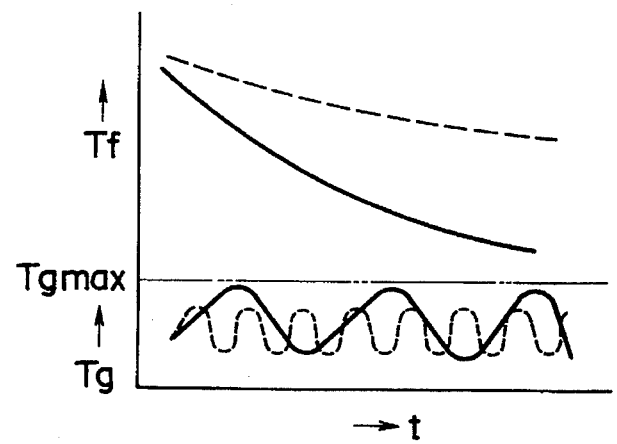
FIG. 12 is a chart showing a relationship between a temperature of the heating apparatus, gas temperature, and time.

When a material temperature in the heating furnace or a furnace temperature is rapidly decreased, as shown in FIG. 12, it is preferable to, while decreasing an amount of fuel to be supplied or shutting off the fuel, extend the operating time in a range in which a measured value $T_g$ of the waste gas temperature after the radiation of heat to the heat regenerator never exceeds an upper limit $T_{gmax}$ of 450° C. heat-proof temperature of an exhaust side member such as the supply and exhaust change-over valve or the exhaust fan. Here, the broken line shows variation of the waste gas temperature $T_g$ by the conventional changing with reference to a time t, and the solid line shows variation of the waste gas temperature Tg in case the operating time is extended according to the present invention. Thus, as shown by the solid line, it is possible to operate so as to more rapidly decrease a furnace temperature $T_f$ than would be in the conventional operation (shown by the broken line) without burning the supply and exhaust change-over valve and the exhaust fan.

In an alternative control mode, the fuel shut-off valve 65 is closed in relation to the waste gas temperature measured by the temperature sensors 50, 50', and the fuel shut-off valve 65 and the supply and exhaust change-over valve 57 are changed over after the elapse of a specified time from the close of the fuel shut-off valve 65. Further, the fuel shut-off valve 65 is opened after the elapse of a specified time from the change-over of the change-over valves 63 and 57.

When the temperature of the combustion waste gas exceeds a specified upper limit, the fuel shut-off valve 65 is closed to stop the operation of the heating apparatus. Therefore, it is possible to reduce overheat of a member exposed to a hot waste gas, resulting in protection and an increased lifetime of the member.

In a transient state in which the combustion operation and the heat regenerating operation of the burner unit are changed over, the control is interrupted to perform only control under a normal state.

Gaseous nitrogen is fed into the fuel conduit 62 or 62' of the burner unit 55 or 55' for heat regenerating operation through the conduit 91 or 91' having the solenoid valve 90 or 90'. In this state, when the fuel conduit 62 or 62' is purged, it is possible to avoid back fire during the combustion operation.

Alternatively, for a time interval from closing to opening the fuel gas shut-off valve 65, it is possible to purge both the fuel conduits 62 and 62' by using the gaseous nitrogen.

Figure 13:
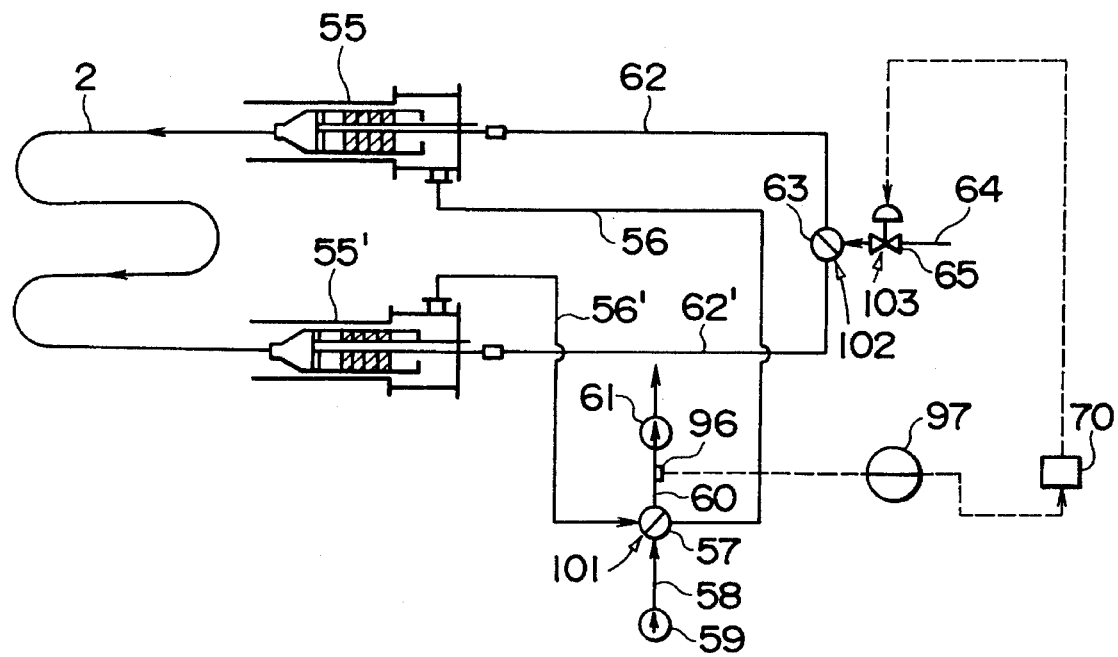
FIG. 13 is a connection diagram of another modification of the heating apparatus.

In FIG. 13, an oxygen sensor or an unburnt gas concentration continuous analyzer 96 is mounted on the waste gas conduit 60 extending from the supply and exhaust change-over valve 57 to the exhaust fan 61 to continuously measure an unburnt gas concentration in the combustion waste gas. The unburnt gas concentration continuous analyzer 96 is connected to the control unit 70 through a combined indicator and alarm device 97. The control unit 70 operates the fuel shut-off valve 65 according to an output signal from the unburnt gas concentration continuous analyzer 96.

The change-over valves 57 and 63 are positioned at changing positions as shown in the drawing, and the burner unit 55 is operated for combustion, while the burner unit 55' is operated for heat regeneration.

Figure 14:
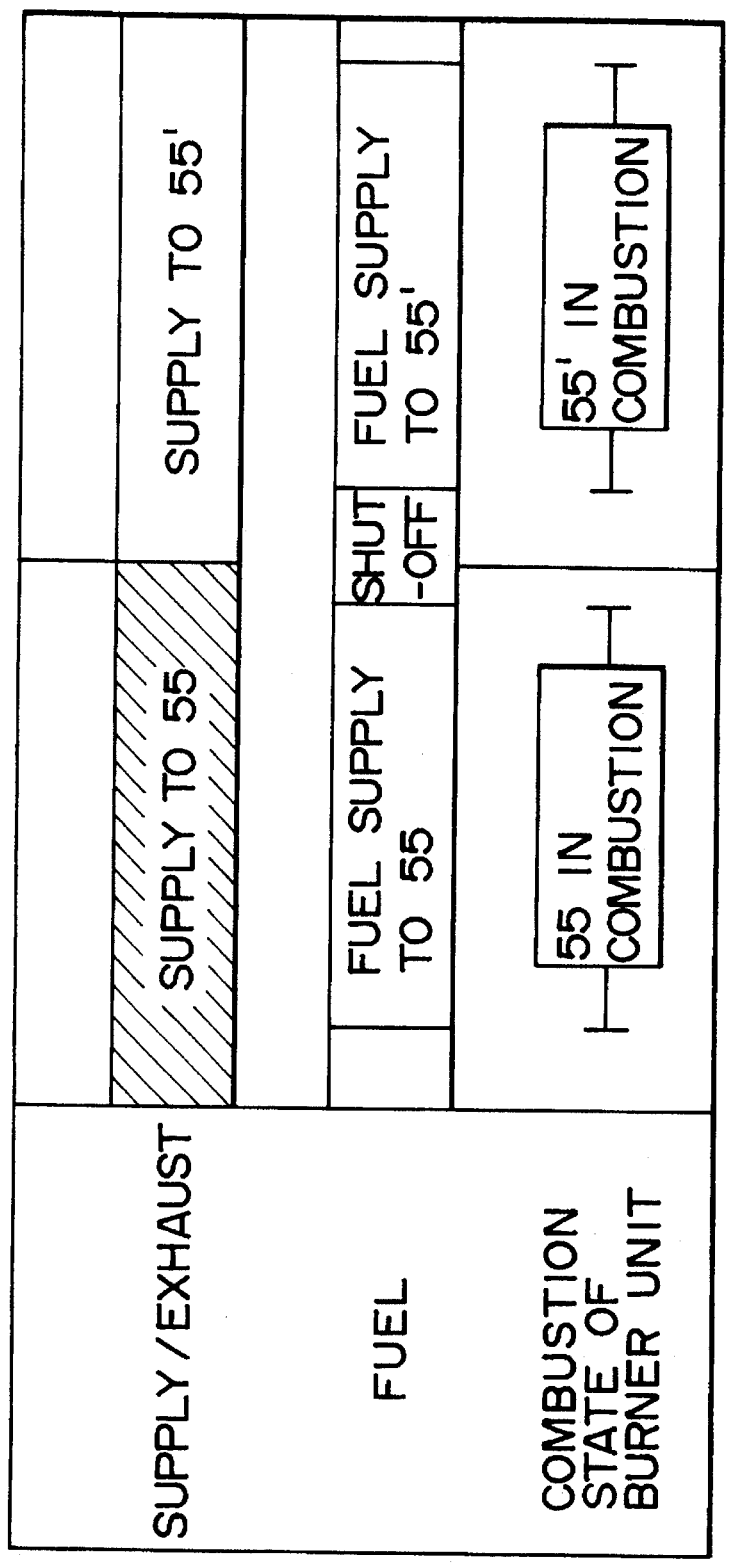
FIG. 14 is a view showing a changing sequence of the heating apparatus.

A hot combustion gas exiting the burner unit 55 radiates heat while passing through the radiant tube 2, and further radiates heat with respect to the heat regenerator 14 of the burner unit 55', resulting in a reduced temperature. The combustion gas passes through the air conduit 56' and the supply and exhaust change-over valve 57 to be externally exhausted by the exhaust fan 61. When the change-over valves 57 and 63 are changed over, the burner unit 55' is operated for combustion, while the burner unit 55 is operated for heat regeneration. As described above, since the fuel shut-off valve is closed for a short time during the change-over, supply of fuel is interrupted to carry out combustion quiescent (see FIG. 14).

Figure 15:
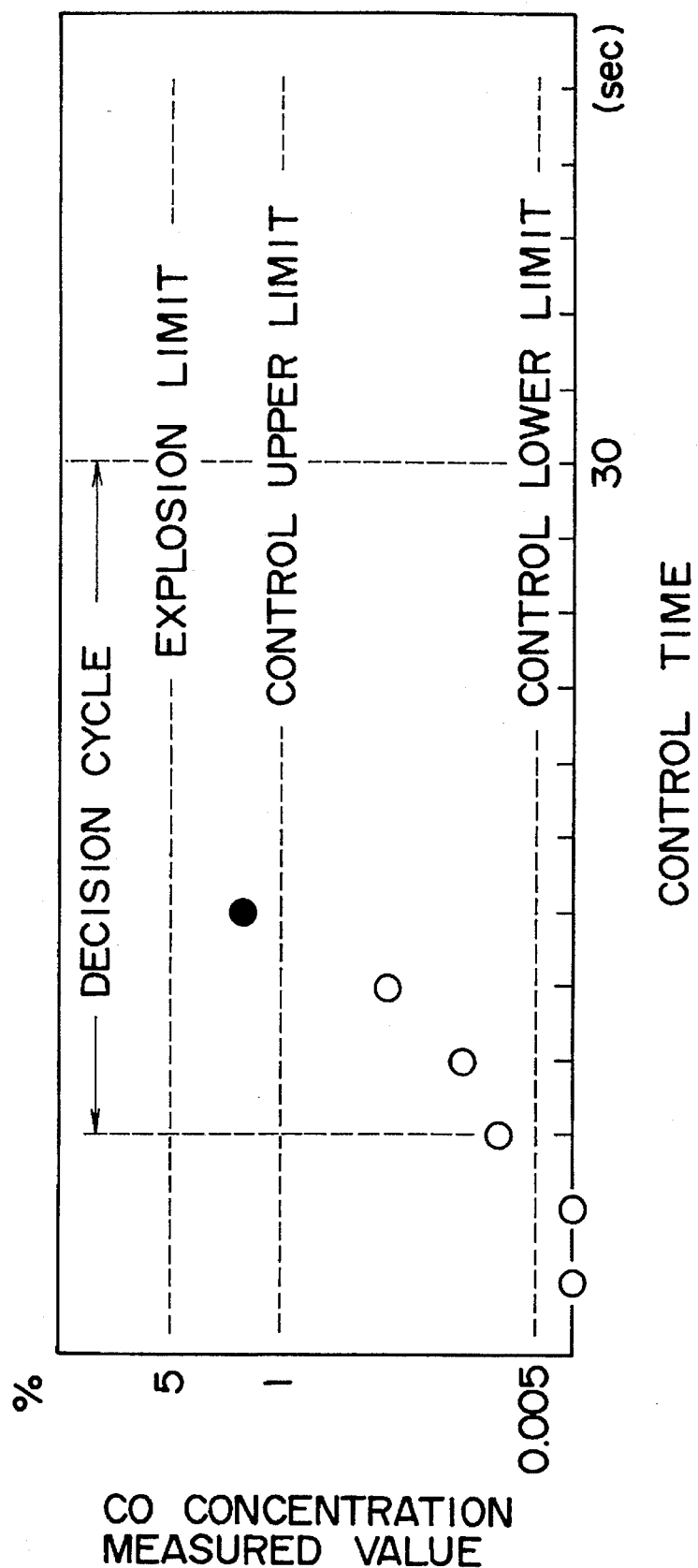
FIG. 15 is a diagram showing a first time-varying pattern of CO concentration in a combustion waste gas.

FIG. 15 shows a time-varying CO concentration which is measured by the sensor 96, for example, for each three second in a decision cycle of 30 second after it is confirmed that a concentration measured value of CO serving as the unburnt gas is greater than a specified lower limit (a control lower limit) as will be described later. It is assumed that, for example, a specified upper limit (a control upper limit) of 1% CO concentration is set to be lower than an explosion limit of 5% CO concentration. If the detected CO concentration exceeds the specified upper limit to increase, it is decided that there is misfire, incomplete combustion or serious degradation of a sealing performance of the fuel change-over valve. Accordingly, the fuel shut-off valve 65 is immediately closed by the control unit 70 to shut off supply of the fuel.

Figure 16:
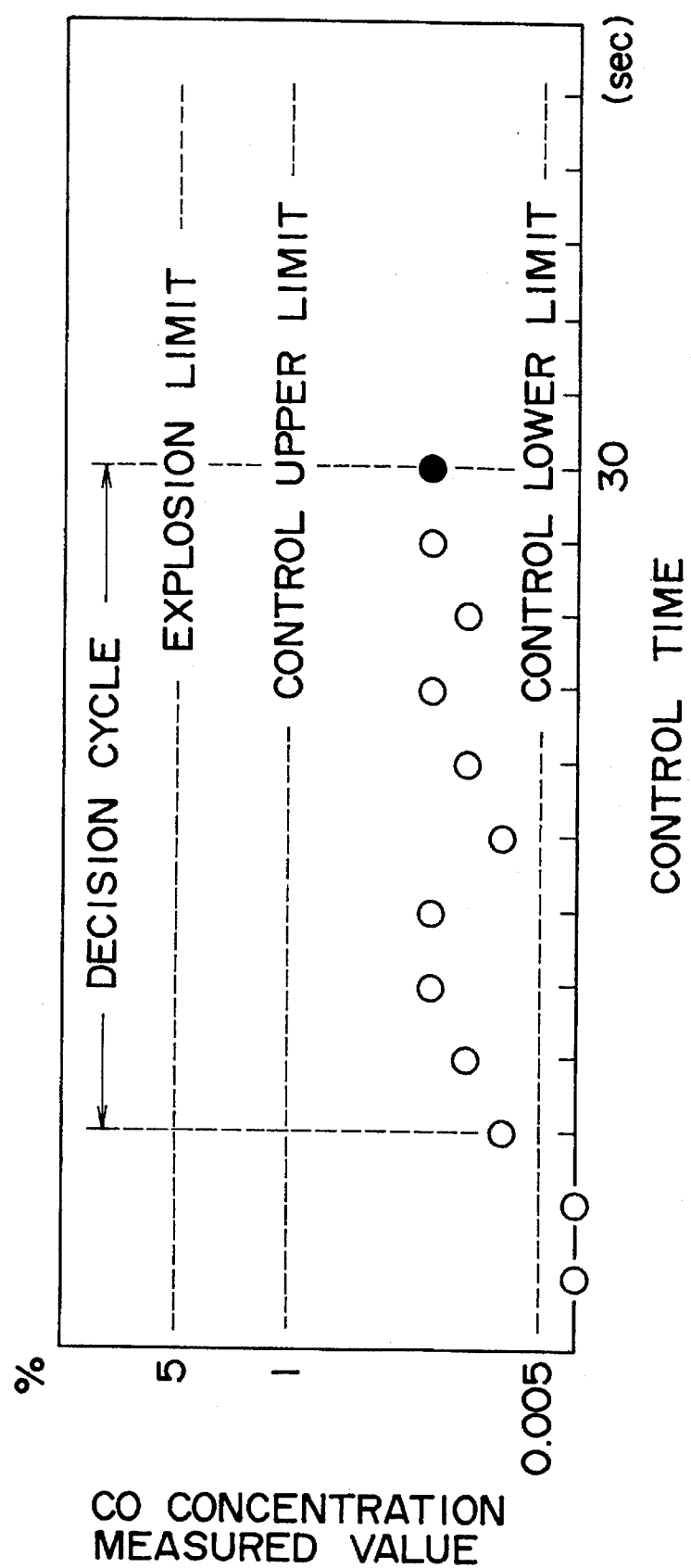
FIG. 16 is a diagram showing a second time-varying pattern of CO concentration in a combustion waste gas.

As shown in FIG. 16, it is assumed that the CO concentration detected in the division cycle varies in a range between the control upper limit and the specified lower limit (the control lower limit) of 0.005% (50 ppm) serving as a reference of no CO leakage. In this case, at a time of end of the decision cycle, it is decided that there is light degradation of a sealing performance of the fuel change-over valve 63. Consequently, the combined indicator and alarm device 97 alarms to indicate failure of the fuel change-over valve, and the fuel shut-off valve 65 is closed by the control unit 70 to shut off supply of the fuel.

Figure 17:
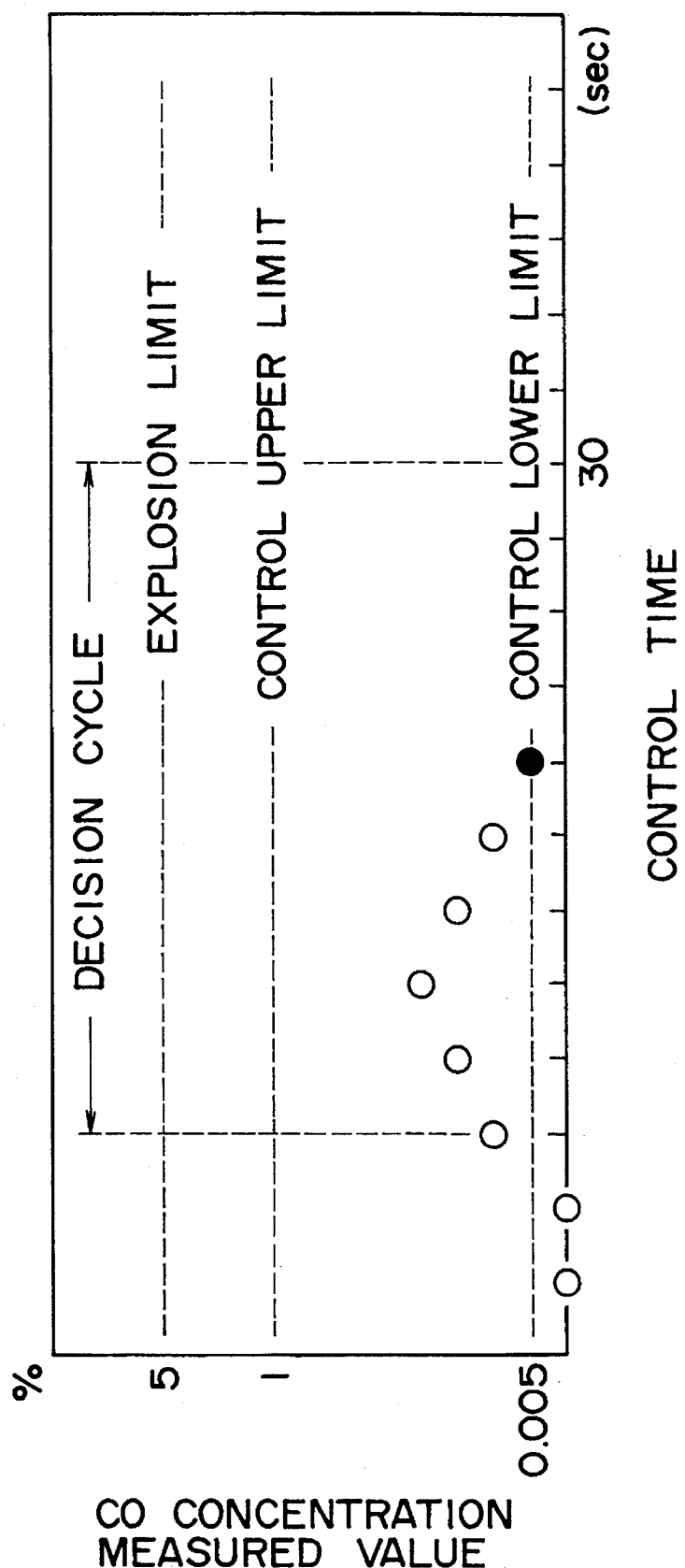
FIG. 17 is a diagram showing a third time-varying pattern of CO concentration in a combustion waste gas.

As shown in FIG. 17, when the detected CO concentration value becomes the control lower limit serving as a reference whether or not the decision is performed, it is decided that insufficient combustion air is substituted for the combustion waste gas in the combustion quiescent time to close the fuel shut-off valve 65. As a result, the combustion quiescent time is extended by a slight additional time ΔT to return to a sampling start time.

Figure 18:
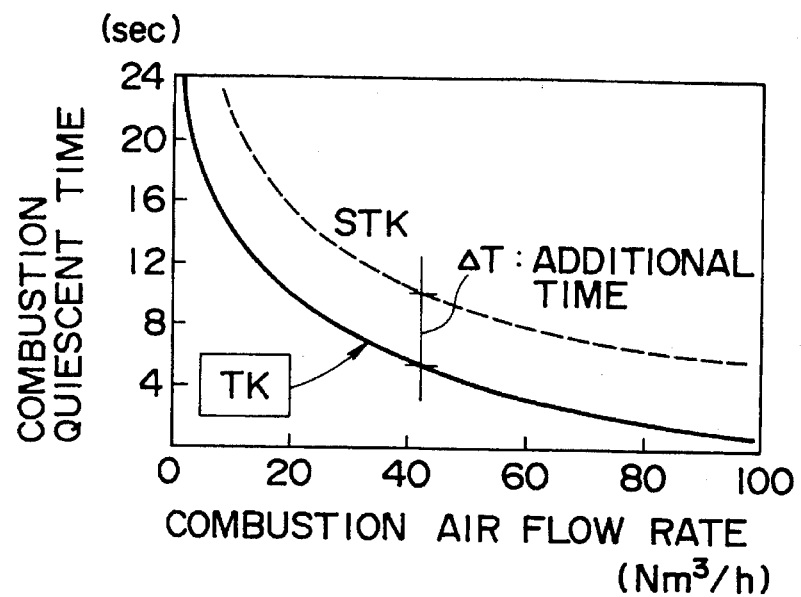
FIG. 18 is a chart showing a relationship between a flow rate of combustion air and a combustion quiescent time.

FIG. 18 shows variation of a theoretical combustion quiescent time in relation to a flow rate of the combustion air. Here, a theoretical value TK (sec) of a combustion time can be expressed as a ratio of a value VGT (Nm) of the combustion waste gas substituting space as described before and a combustion air flow rate VAR ($Nm^3/h$) as follows:

$$TK = VGT \times 3600/VAR$$

The theoretical value TK describes hyperbolas because VGT is constant. The slight additional time ΔT of, for example, 0.5 second is added to the combustion quiescent time TK, resulting in an actual fuel quiescent time during the change-over, that is, a shut-off time of the fuel shut-off valve 65 as follows:

$$STK = TK + \Delta T$$

Further, both the change-over valves 57 and 63 and the fuel shut-off valve 65 are provided with sensors 101, 102 and 103 serving as a limit switch or a proximity switch. Accordingly, it is possible to decide abnormality that a valve element is fixed by foreign materials at a neutral position so as to interrupt supply of the fuel.

Figure 19:
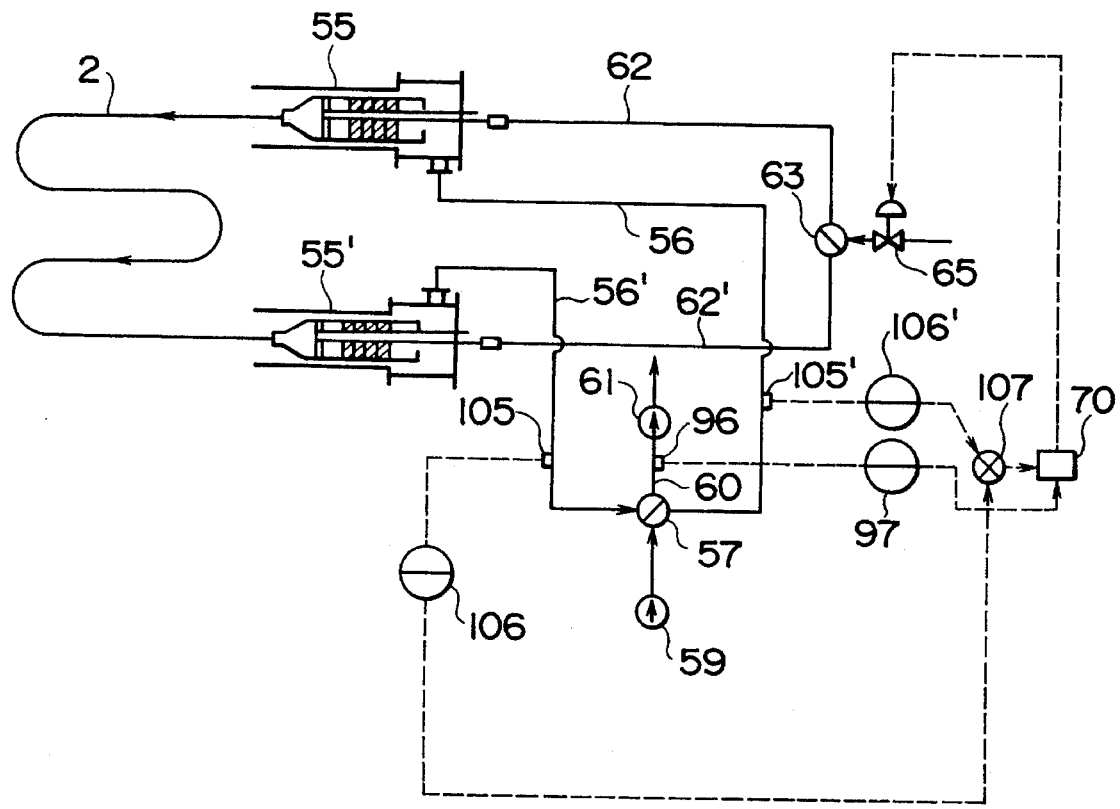
FIG. 19 is a connection diagram of a further modification of the heating apparatus.

As a modification of the configuration in FIG. 13, referring now to FIG. 19, the air conduits 62, 62' and the waste gas conduit 60 extending from the supply and exhaust change-over valve 57 to exhaust fan 61 are respectively provided with oxygen sensors 105, 105' and 96 to measure an oxygen concentration of the combustion waste gas. The oxygen sensors 105, 105' in the air conduits 62, 62' can be selectively connected by a change-over switch 107 to the control unit 70 through the combined indicator and alarm devices 106, 106'. The oxygen sensor 96 in the waste gas conduit 60 is also connected to the control unit 70 through the combined indicator and alarm device 97. The change-over switch 107 is changed over in combination with both the change-over valves 57 and 63 to provide the control unit 70 with a signal concerning an unburnt gas concentration, that is, an oxygen concentration of the combustion waste gas passing through the air conduit 56 or 56' of the burner unit for heat regenerating operation after radiation of heat. The control unit 70 operates the fuel shut-off valve 65 according to a difference between a measured value of the oxygen sensor 105 or 105' and a measured value of the oxygen sensor 96.

When no leakage occurs in the supply and exhaust change-over valve 57, there is a considerably trivial difference between an oxygen concentration measured value of the oxygen sensor 96 and the oxygen concentration measured value of the oxygen sensor 105 or 105'. However, it is assumed that the sealing performance of the supply and exhaust change-over valve 57 is degraded, and air leakage occurs from the air side to the combustion waste gas side of the valve. In this case, as an amount of the leakage becomes larger, as shown in FIG. 20, the difference between the measured value of the oxygen sensor 105 or 105' and the measured value of the oxygen sensor 96 becomes larger. When the difference becomes not less than a predetermined value, the combined indicator and alarm device 97 alarms or the control unit 70 operates the fuel shut-off valve 65 to shut off supply of the fuel to the burner unit for combustion operation. It is thereby possible to stop the operation of the entire heating apparatus and repair the supply and exhaust change-over valve 57.

A time interval between the operation of the fuel shut-off valve 65 and the operation of both the change-over valves 57, 63 may be preferably varied in relation to the flow rate of the combustion air, thereby improving efficiency.

Alternatively, operations of pairs of burner units 55, 55' may be sequentially changed over at specified time intervals. As a result, it is possible to maintain reduced variation of the temperature in the heating apparatus and maintain reduced pressure variation of the fuel in the fuel conduit 62 or 62'.

The fuel shut-off valve 65 and both the change-over valves 57 and 63 may be changed over gradually not in a moment. Consequently, the fuel and the air are gradually supplied and the waste gas is gradually exhausted, resulting in reduced generation of unburnt gas components.

Figure 21:
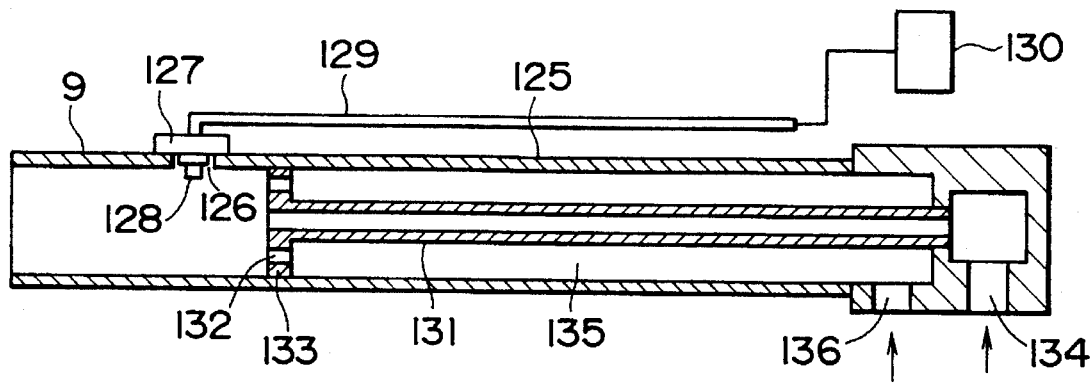
FIG. 21 is a sectional view taken along an axis of a pilot burner.

As shown in FIG. 21, in order to detect pilot flame in the pilot burner 9, an aperture 126 is provided in a burner tube 125 at a position apart from a tip end of the pilot burner 9, and a combined ignition and flame detection pin electrode 128 insulated and supported by a glass 127 slightly extends into the burner tube 125 through the aperture 126. Though high voltage of, for example, 6000 V is applied for ignition between the electrode 128 and the burner tube 125, means for this purpose is not shown. The electrode 128 also serves as a pilot flame detecting electrode and is connected to an amplifier 130 through a conductor 129. A tip end of a pilot fuel supply tube 131 concentrically mounted on the burner tube 125 and axially extending extends to a position before the electrode 128 and is supported by a flange 133 having a hole 132 in the burner tube 128. In order to continuously maintain pilot flame of the pilot burner 9 at all times, the pilot fuel supply tube 131 is fed through a connecting port 134 with fuel such as town gas or LPG gas. An annular air path 135 defined between the pilot fuel supply tube 131 and the burner tube 125 is also connected through the connecting port 136 to an air source which is different from that for the main burner 6.

Figure 22:
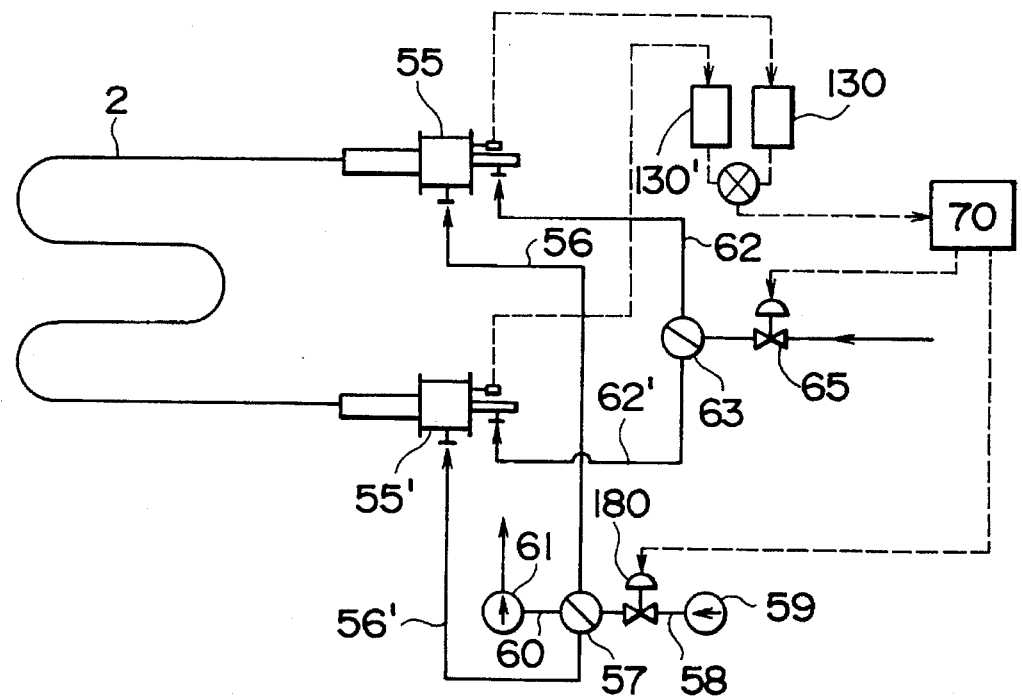
FIG. 22 is a having a flame detecting electrode.

Referring now to FIG. 22, amplifiers 130, 130' respectively connected to pilot flame detecting electrodes of the burner units 55, 55' are connected to the control unit 70.

Only when the pilot burner 9 has a pilot flame, the fuel shut-off valve 65 is opened to enable supply of fuel to the burner unit for combustion.

When, in at least one of the burner units 55 and 55', the pilot burner 9 has no pilot flame (i.e., in case of misfire), the fuel shut-off valve 65 is closed to shut off supply of a fuel gas.

In this case, the fuel shut-off valve 65 is controlled by the control unit 70 so as to feed the fuel for combustion operation to only the burner unit whose flame is detected. Further, air is periodically and alternately fed to both the burner units 55, 55' through the supply and exhaust change-over valve 57.

During the misfire in one of the burner units 55 and 55', it is also possible to close the fuel shut-off valve 65 so as to shut off supply of the fuel to both the burner units 55 and 55'.

Further, in this case, it is also possible to interrupt supply of the combustion air to both the burner units 55 and 55' through an air shut-off valve 180.

We claim:

1. A heating apparatus, comprising:

at least a pair of regenerative burner units having each fuel injection nozzle and a heat regenerator located in a combustion air supply path; and means for alternatingly causing one of the regenerative burner units to perform a combustion operation and another of the regenerative burner units to perform a regenerating operation, the causing means including:

means for alternatively supplying fuel to the one and another regenerative burner units and including a fuel shut-off valve and a fuel change-over valve; and means for alternatively supplying combustion air to the one and another regenerative burner units and including a supply and exhaust change-over valve;

wherein each of the regenerative burner unit has an air conduit connected with the supply and exhaust change-over valve and serving for admitting the combustion air when a respective burner unit performs a combustion operation, and for exhausting combustion waste gas when the respective burner unit perform a regenerating operation, and wherein a sensor is associated with the air conduit for measuring a temperature of the exhausting combustion waste gas downstream of the supply and exhaust change-over valve when the respective regenerative burner unit perform the regenerating operation.

2. A heating apparatus according to claim 1, further comprising a radiant tube, the regenerative burner units being connected to two ends of the radiant tube, respectively.

3. A heating apparatus, comprising:

at least a pair of generative burner units having each a fuel injection nozzle and a heat regenerator located in a combustion air supply path; and means for alternatingly causing one of the regenerative burner units to perform a combustion operation and another of the regenerative burner units to perform a regenerating operation, the causing means including:

means for alternatively supplying fuel to the one and other regenerative burner units and including a fuel shut-off valve and a fuel change-over valve; and means for alternatively supplying combustion air to the one and another regenerative burner units and including a supply and exhaust change-over valve;

wherein a flow regulating valve is provided in the air conduit for controlling supply of the combustion air when a respective regenerative burner unit performs a combustion operation, and wherein the heating apparatus further comprises means for controlling operation of the flow regulating valve in accordance with at least one of oxygen concentration of the combustion waste gas and a pressure difference between a regenerative burner unit performing a combustion operation and a regenerative unit performing heat regenerating operation.

4. A heating apparatus, comprising:

at least a pair of regenerative burner units having each a fuel injection nozzle and a heat regenerator located in a combustion air supply path; and means for alternatingly causing one of the regenerative burner units to perform a combustion operation and another of the regenerative burner units to perform a regenerating operation, the causing means including:

means for alternatively supplying fuel to the one and another regenerative burner units and including a fuel shut-off valve and a fuel change-over valve; and means for alternatively supplying combustion air to the one and another regenerative burner units and including a supply and exhaust change-over valve;

wherein the fuel change-over valve comprises a three-way valve common for both regenerative burner units, and the supply and exhaust change-over valve comprises two three-way valves associated with the pair of regenerative burner units, respectively.

5. A heating apparatus according to claim 4, wherein the fuel change-over valve and the supply and exhaust change-over valve operate synchronously with each other.

6. A heating apparatus, comprising:

at least a pair of regenerative burner units having each a fuel injection nozzle and heat regenerator means located in a combustion air supply path; and means for alternatingly causing one of the regenerative burner units to perform a combustion operation and another of the regenerative burner units to perform a regenerating operation, the causing means including:

means for alternatively supplying fuel to the one and another regenerative burner units and including a fuel shut-off valve and a fuel change-over valve; and means for alternatively supplying combustion air to the one and another regenerative burner units and including a supply and exhaust change-over valve;

wherein the heat regenerator means comprises a ceramic heat regenerator arranged at a side of the air conduit adjacent to a respective regenerative burner unit, and at least one metal heat regenerator.

7. A heating apparatus according to claim 6, wherein the metal heat regenerator has a wire-mesh structure.

8. A heating apparatus, comprising:

at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, the causing means including:

means for alternatively supplying fuel to the one and another regenerative burner units and including a fuel shut-off valve and a fuel change-over valve; and means for alternatively supplying combustion air to the one and another regenerative burner units and including a supply and exhaust change-over valve;

wherein heat capacity of the heat regenerator is 0.4 of a quantity of heat in the combustion waste gas.

9. A regenerative burner unit for use in a regenerative heating apparatus, comprising:

a cylindrical housing;

a combustion cylinder concentrically mounted within the cylindrical housing in radially space relationship relative to the cylindrical housing, the combustion cylinder having a peripheral wall and a plurality of holes distributed in the peripheral wall;

a main burner extending along a central axis of the combustion cylinder and having a fuel injection nozzle opened in an area of a rear portion of the combustion cylinder; and at least one heat regenerator provided in a combustion air supply path defined between the main burner and the cylindrical housing, the heat regenerator comprising a plurality of segments.

10. A regenerative burner unit according to claim 9, wherein the combustion cylinder is formed of a ceramic material.

11. A regenerative burner unit according to claim 9, wherein each segment comprises a segment-shaped container and a plurality of heat regenerating elements accommodated therein.

12. A regenerative burner unit according to claim 9, wherein the main burner comprises a burner gun, and a pilot burner and a combined ignition and flame detection pin electrode both mounted on the burner gun.

13. A regenerative burner unit according to claim 9, wherein the heat generator has an end surface, a plurality of axially extending notches defined by the plurality of segments and intersecting the end surface, and a masking shield for covering the end surface.

14. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation; which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

measuring a temperature of the combustion waste gas; and effecting at least one of closing the fuel shut-off valve and carrying out change-over in both the fuel change-over valve in accordance with the measured temperature to reverse an operational mode of the regenerative burner units.

15. A method according to claim 14, wherein the effecting step comprises both the closing the shut-off valve and carrying out the change-over in both the fuel change-over valve and the supply and exhaust change-over valve, and includes carrying out the change-over in both the fuel change-over valve and the supply and exhaust change-over valve after a predetermined time lag from a closing time of the fuel shut-off valve; and wherein the method further comprises the step of opening the fuel shut-off valve after a predetermined time lag from a time of carrying out the change-over in both the fuel change-over valve and the supply and exhaust change-over valve.

16. A method according to claim 15, wherein the opening step includes varying the value of the time lag according to a combustion air flow rate.

17. A method according to claim 14, wherein the effecting step comprises both the closing the fuel shut-off valve and carrying out the change-over in both the fuel change-over valve and the supply and exhaust change-over valve, and includes carrying out the change-over in both the fuel change-over valve and the supply and exhaust change-over valve when the measured combustion waste gas temperature does not exceed a predetermined upper limit of a heat-proof temperature of a member affected by heat of the heating apparatus, and closing the fuel shut-off valve when the measured combustion gas temperature exceeds the predetermined upper limit.

18. A method according to claim 14, wherein the heating apparatus comprises a plurality of pairs of regenerative burner units, and wherein the effecting step includes carrying out change-over of the plurality of pairs of regenerative burner units at time intervals to prevent simultaneously changing-over of two pairs of regenerative burner units.

19. A method according to claim 14, further comprising the step of causing the fuel shut-off valve to operate the fuel change-over valve and the supply and exhaust change-over valve at a predetermined speed.

20. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

starting control of a fuel flow rate, a combustion air flow rate, and waste gas pressure after a predetermined time lag from an opening time of the fuel shut-off valve; and interrupting the control of the fuel flow rate, the combustion air flow rate, and the waste gas pressure during operation of the fuel-shut-off valve and both the fuel change-over valve and the supply and exhaust change-over valve.

21. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the step of:

purging remaining fuel in a conduit connecting a regenerative burner unit and the fuel change-over valve by feeding gaseous nitrogen to the connecting conduit when the regenerative burner unit performs the regenerating operation to thereby avoid backfire when the regenerative burner unit is switch to performing the combustion operation.

22. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the step of:

purging remaining fuel in conduits connecting the regenerative burner units with the fuel change-over valve by feeding gaseous nitrogen to the connecting units before opening and after closing of the fuel change-over valve to thereby avoid backfire when a respective regenerative burner unit performs a combustion operation.

23. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

continuously detecting, according to a specified cycle, an unburnt gas concentration; and effecting at least one of shutting off supply of the fuel to the regenerative burner unit performing the combustion operation when the detected unburnt gas concentration exceeds a predetermined upper limit of the unburnt gas concentration, carrying at least one of operating an alarm and shutting off supply of the fuel to the generative burner unit performing the combustion operation when the detected unburnt gas concentration is between predetermined upper and lower limits of the unburnt gas concentration, and controlling operational times of the fuel shut-off valve and both the fuel change-over valve and the supply and exhaust change-over valve when the detected unburnt gas concentration does not exceed the predetermined lower limit of the unburnt gas concentration.

24. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

monitoring operation of the fuel shut-off valve and both the fuel change-over valve and the supply and exhaust change-over valve; and shutting-off fuel supply when the operation of at least one of the fuel shut-off valve, the fuel change-over valve and the supply and exhaust change-over valve is abnormal.

25. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

comparing a measured value of one of a remaining oxygen concentration and an unburnt gas concentration in a combustion waste gas flowing from a regenerative burner unit performing the heat regeneration operation through a portion of the air conduit located upstream of the supply and exhaust change-over valve with a measured value of the one of a remaining oxygen concentration and an unburnt gas concentration, respectively, flowing downstream of the supply and exhaust change-over valve; and shutting off the fuel when a difference between two measured values exceeds a predetermined value.

26. A method of operating a heating apparatus comprising at least a pair of regenerative burner units having each a fuel injection nozzle and a heat regenerator located in a combustion supply path; and means for alternatingly causing one of the regenerative burner units to perform a combustion operation and another of the regenerative burner units to perform a regenerating operation, which causing means includes means for alternatively supplying fuel to the one and another regenerative burner units and including a fuel shut-off valve and a fuel change-over valve, and means for alternatively supplying combustion air to the one and another regenerative burner units and including a supply and exhaust change-over valve, the method comprising the steps of:

continuously detecting flame in each of the pair of regenerative burner units; and alternatively opening and closing the fuel shut off valve to provide for fuel flow for the combustion operation to a regenerative burner unit the flame of which is detected.

27. A method according to claim 26, further comprising the step of closing the fuel shut-off valve if no flame is detected in any of the regenerative burner units.

* * * * *